(12) United States Patent
Hou

(10) Patent No.: US 9,094,243 B2
(45) Date of Patent: Jul. 28, 2015

(54) METHOD, APPARATUS, RECEIVER AND COMMUNICATION DEVICE FOR ESTIMATING PHASE NOISE

(75) Inventor: Xiaohui Hou, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 14/358,907

(22) PCT Filed: Jun. 27, 2012

(86) PCT No.: PCT/CN2012/077675
§ 371 (c)(1),
(2), (4) Date: May 16, 2014

(87) PCT Pub. No.: WO2013/071759
PCT Pub. Date: May 23, 2013

(65) Prior Publication Data
US 2014/0334529 A1 Nov. 13, 2014

(30) Foreign Application Priority Data

Nov. 17, 2011 (CN) .......................... 2011 1 0366298

(51) Int. Cl.
*H03H 7/40* (2006.01)
*H04L 25/02* (2006.01)
*H04L 27/00* (2006.01)

(52) U.S. Cl.
CPC .......... *H04L 25/024* (2013.01); *H04L 27/0014* (2013.01); *H04L 2027/0067* (2013.01)

(58) Field of Classification Search
CPC ............... H04B 7/0632; H04B 7/0626; H04B 1/10–1/14; H04B 1/1027–1/126; H04B 1/16–1/302; H04B 3/04–3/18; H04L 25/08
See application file for complete search history.

(56) References Cited

U.S. PATENT DOCUMENTS

| 2002/0145971 | A1* | 10/2002 | Cho et al. ...................... 370/208 |
| 2010/0002810 | A1* | 1/2010 | Li et al. ........................ 375/325 |
| 2011/0069788 | A1* | 3/2011 | Tomezak ....................... 375/326 |

* cited by examiner

*Primary Examiner* — Dac Ha
(74) *Attorney, Agent, or Firm* — Panitch Schwarze Belisario & Nadel LLP

(57) ABSTRACT

A method and apparatus for estimating phase noise, a receiver, and a communication device are provided. The method includes: obtaining a transmitted symbol estimation value ã(k) which is corresponding to a equalized symbol r(k) of received data, where k=0, . . . , K−1, and K is the number of symbols in one received data frame; obtaining a public phase noise estimation value according to r(k) and ã(k); obtaining a residual phase noise estimation value according to r(k), ã(k), and the public phase noise estimation value; obtaining a phase noise estimation value according to the public phase noise estimation value, the residual phase noise estimation value and a basis function matrix of Discrete Cosine Transform. The technical solution of the disclosure can estimate the phase noise effectively, then compensate the receiving signals which are influenced by the phase noise, achieve the purpose for accurately detecting the transmitted symbol, and improve system performance.

20 Claims, 3 Drawing Sheets

METHOD, APPARATUS, RECEIVER AND COMMUNICATION DEVICE FOR ESTIMATING PHASE NOISE

CROSS-REFERENCE TO RELATED APPLICATIONS

This application is a Section 371 of International Application No. PCT/CN2012/077675, filed Jun. 27, 2012, which was published in the Japanese language on May 23, 2013, under International Publication No. WO 2013071759 A1 and the disclosure of which is incorporated herein by reference.

TECHNICAL FIELD

The disclosure relates to the field of wireless communication, especially relates to a method and apparatus for estimating phase noise, a receiver and a communication device.

BACKGROUND

In the wireless communication, a carrier signal is usually not a sine wave with a single frequency due to the instability of the local oscillators of a transmitter and a receiver. For this reason, when the carrier frequency of a wireless communication system is relatively high, and when the wireless communication system uses a high-order modulation mode, the influence of phase noise is usually not to be ignored. Therefore, the receiver must estimate the phase noise introduced by the whole link and compensate the receiving signals which are influenced by the phase noise so as to achieve the purpose of accurately detecting the transmitted data symbol.

At present, there are mainly several types of methods for estimating phase noise, which are described as follows.

Method 1, a phase-locked loop is used to track phase noise, and a second-order phase-locked loop is usually used at present.

Method 2, the time for receiving signals is divided into a plurality of time slices, phase noise in each time slice is approximatively set to be constant, and the phase average in a specific time slice is acquired by an appropriate statistical algorithm.

Method 3, an interpolation-based algorithm: a specific frame structure is constructed, for example, both the head and the tail of each frame have pilot frequencies, the phase noise at the pilot frequency position of each data frame is estimated firstly, and the phase noise at the data symbol part in the frame is achieved through interpolation.

Method 4, a joint detection estimating algorithm based on channel and phase noise: this method is high in complexity and large in the time delay of signal processing.

As regards the above-mentioned Method 1, the phase-locked loop needs a certain capture time to lock the phase, as a result, the phase noise cannot be compensated in time.

As regards the above-mentioned Methods 2-4, the statistical property of the phase noise is needed, and the accuracy for estimating the phase noise is not high enough.

SUMMARY

A method and apparatus for estimating phase noise, a receiver, and a communication device are provided by the disclosure to improve the accuracy for phase noise estimation, thereby improving the receiving performance of the receiver.

In order to solve the above-mentioned technical problems, the disclosure provides the following technical solutions.

A method for estimating phase noise includes:

obtaining a transmitted symbol estimation value $\tilde{a}(k)$ which is corresponding to a equalized symbol $r(k)$ of received data, where $k=0, \ldots, K-1$, and K is the number of symbols in one received data frame;

obtaining a public phase noise estimation value according to $r(k)$ and $\tilde{a}(k)$;

obtaining a residual phase noise estimation value according to $r(k)$, $\tilde{a}(k)$ and the public phase noise estimation value; and obtaining a phase noise estimation value according to the public phase noise estimation value, the residual phase noise estimation value and a basis function matrix of Discrete Cosine Transform.

Preferably, obtaining the transmitted symbol estimation value $\tilde{a}(k)$ corresponding to the equalized symbol $r(k)$ comprises:

obtaining $\tilde{a}(k)$ by performing a hard-decision on $r(k)$; or obtaining $\tilde{a}(k)$ by performing a soft-decision on $r(k)$ and performing reconstruction on the bases of a result of the soft-decision.

Preferably, the public phase noise estimation value is obtained according to the following formula:

$$\tilde{\theta}_{avg} = \arg\left(\sum_{k=0}^{K-1} r(k)\tilde{a}^*(k)\right)$$

where $\tilde{\theta}_{avg}$ is the public phase noise estimation value, $(\ )^*$ represents a conjugate operation, $\arg(\ )$ represents to obtain argument of a complex number.

Preferably, the residual phase noise estimation value is obtained according to the following formula:

$$\tilde{\phi}(k) = \arg(r(k)\tilde{a}^*(k)e^{-j\tilde{\theta}_{avg}})$$

where $\tilde{\phi}(k)$ is the residual phase noise estimation value of the kth symbol.

Preferably, the phase noise estimation value is obtained according to the following formula:

$$\tilde{\theta}(k) = \tilde{\theta}_{avg} + \sum_{k'=0}^{K-1} (\Psi_K \Psi_K^T)_{k,k'} \tilde{\phi}(k')$$

where $\tilde{\theta}(k)$ is the phase noise estimation value, $\Psi_K$ is the basis function matrix of Discrete Cosine Transform, $\Psi_K^T$ is transposition of $\Psi_K$, $(\Psi_K)_{k,n} = \psi_n(k)$, and $\psi_n(k)$ is the nth basis function matrix of Discrete Cosine Transform, $n=0, \ldots, N-1$, and N is the number of basis functions.

Preferably, the residual phase noise estimation value is obtained according to the following formula:

$$\tilde{\phi}_B(m) = \frac{1}{B}\arg\left(\sum_{b=0}^{B-1} r(b+mB)e^{-j\tilde{\theta}_{avg}}\tilde{a}^*(b+mB)\right)$$

where K symbols of one received data frame are divided into M segments, each segment including B symbols, and $\tilde{\phi}_B(m)$ is the residual phase noise estimation value of one or more symbols of the mth segment, $m=0, \ldots, M-1$.

Preferably, the phase noise estimation value is obtained according to the following formula:

$$\tilde{\theta}_B(k) = \tilde{\theta}_{avg} + \sum_{m=0}^{M-1} \left( \Psi_K (\Psi_{avg}^T \Psi_{avg})^{-1} \Psi_{avg} \right)_{k,m} \tilde{\phi}_B(m)$$

where $\tilde{\theta}_B(k)$ is the phase noise estimation value, $\Psi_K$ is the basis function matrix of Discrete Cosine Transform, $(\Psi_K)_{k,n} = \psi_n(k)$, and $\psi_n(k)$ is the nth basis function of Discrete Cosine Transform, $n=0, \ldots, N-1$, N is the number of basis functions, and $\Psi_{avg}^T$ is transposition of the $\Psi_{avg}$, $$(\Psi_{avg})_{m,n} = \frac{1}{B} \sum_{b=0}^{B-1} \psi_n(b + mB).$$

An apparatus for estimating phase noise includes:

a transmitted symbol estimating unit, configured to obtain a transmitted symbol estimation value $\tilde{a}(k)$ which is corresponding to a equalized symbol $r(k)$ of received data, where $k=0, \ldots, K-1$, and K is the number of symbols in one received data frame;

a public phase noise estimating unit, configured to obtain a public phase noise estimation value according to $r(k)$ and $\tilde{a}(k)$;

a residual phase noise estimating unit, configured to obtain a residual phase noise estimation value according to $r(k)$, $\tilde{a}(k)$ and the public phase noise estimation value; and a phase noise estimating unit, configured to obtain a phase noise estimation value according to the public phase noise estimation value, the residual phase noise estimation value and a basis function matrix of Discrete Cosine Transform.

Preferably, the transmitted symbol estimating unit is further configured to:

obtain $\tilde{a}(k)$ by performing a hard-decision on $r(k)$; or obtain $\tilde{a}(k)$ by performing a soft-decision on $r(k)$ and performing reconstruction on the bases of a result of the soft-decision.

Preferably, the public phase noise estimating unit is further configured to obtain the public phase noise estimation value according to the following formula:

$$\tilde{\theta}_{avg} = \arg\left( \sum_{k=0}^{K-1} r(k) \tilde{a}^*(k) \right)$$

where $\tilde{\theta}_{avg}$ is the public phase noise estimation value, $(\ )^*$ represents a conjugate operation, $\arg(\ )$ represents to obtain argument of a complex number.

Preferably, the residual phase noise estimating unit is further configured to obtain the residual phase noise estimation value according to the following formula:

$$\tilde{\phi}(k) = \arg(r(k) \tilde{a}^*(k) e^{-j\tilde{\theta}_{avg}})$$

where $\tilde{\phi}(k)$ is the residual phase noise estimation value of the kth symbol.

Preferably, the phase noise estimating unit is further configured to obtain the phase noise estimation value according to the following formula:

$$\tilde{\theta}(k) = \tilde{\theta}_{avg} + \sum_{k=0}^{K-1} (\Psi_K \Psi_K^T)_{k,k'} \tilde{\phi}(k')$$

where $\tilde{\theta}(k)$ is the phase noise estimation value, $\Psi_K$ is the basis function matrix of Discrete Cosine Transform, $\Psi_K^T$ is transposition of $\Psi_K$, $(\Psi_K)_{k,n} = \psi_n(k)$, $\psi_n(k)$ is the nth basis function matrix of Discrete Cosine Transform, $n=0, \ldots, N-1$, and N is the number of basis functions.

Preferably, the residual phase noise estimating unit is further configured to obtain the residual phase noise estimation value according to the following formula:

$$\tilde{\phi}_B(m) = \frac{1}{B} \arg\left( \sum_{b=0}^{B-1} r(b + mB) e^{-j\tilde{\theta}_{avg}} \tilde{a}^*(b + mB) \right)$$

wherein K symbols of one received data frame are divided into M segments, each segment including B symbols, and $\tilde{\phi}_B(m)$ is the residual phase noise estimation value of one or more symbols of the mth segment, $m=0, \ldots, M-1$.

Preferably, the phase noise estimating unit is further configured to obtain the phase noise estimation value according to the following formula:

$$\tilde{\theta}_B(k) = \tilde{\theta}_{avg} + \sum_{m=0}^{M-1} \left( \Psi_K (\Psi_{avg}^T \Psi_{avg})^{-1} \Psi_{avg} \right)_{k,m} \tilde{\phi}_B(m)$$

where $\tilde{\theta}_B(k)$ is the phase noise estimation value, $\Psi_K$ is the basis function matrix of Discrete Cosine Transform, $(\Psi_K)_{k,n} = \psi_n(k)$, $\psi_n(k)$ is the nth basis function of Discrete Cosine Transform, $n=0, \ldots, N-1$, N is the number of basis functions, and $\Psi_{avg}^T$ is transposition of the $\Psi_{avg}$, $$(\Psi_{avg})_{m,n} = \frac{1}{B} \sum_{b=0}^{B-1} \psi_n(b + mB).$$

A receiver includes the above-mentioned device for estimating phase noise.

A communication device includes the above-mentioned receiver.

Compared with the related art, the beneficial effects of the disclosure include:

the technical solution of the disclosure does not need capture time, therefore, the phase noise compensation can be started quickly; moreover, the statistical property of phase noise is not needed in the technical solution of the disclosure, and the accuracy for phase noise estimation is relatively high. The technical solution of the disclosure can estimate the phase noise effectively so as to compensate the receiving signals which are influenced by the phase noise, thereby achieving the purpose for accurately detecting the transmitted symbol and improving the system performance.

DETAILED DESCRIPTION OF THE EMBODIMENTS

In order to make the purpose, the technical solution and the advantage of the disclosure more clear, the disclosure is further described in details with reference to the accompanying drawings and embodiments below.

The principle for estimating phase noise of the embodiments of the disclosure is introduced firstly.

As a discrete random process when the bandwidth is far lower than the sampling rate can be expanded using a basis function, and the number of the expanded items is usually not so much, generally, the phase noise of the wireless communication system on a digital baseband can be considered as such a discrete random process. Therefore, the phase noise process is orthogonally expanded using a discrete cosine transform (DCT) function in the embodiments of the disclosure.

Without loss of generality, it is assumed that one baseband data frame includes K symbols. Assuming that, at the moment of k (corresponding to the kth symbol), a equalized symbol output through an equalizer by a receiver of a receiving device is r(k), the transmitted symbol of a sending device corresponding to the r(k) is a(k), the white Gaussian noise is n(k), the phase noise is θ(k), then the equalized symbol r(k) can be represented to be:

$$r(k)=a(k)e^{j\theta(k)}+n(k), k=0,\ldots,K-1 \quad (1)$$

The embodiment of the disclosure estimates the phase noise through a reasonable algorithm so as to obtain an estimation value $\tilde{\theta}(k)$ of the phase noise of the kth symbol. After $\tilde{\theta}(k)$ is obtained, r(k) is compensated to obtain a signal z(k) subjected to phase noise compensation, as follows:

$$z(k)=r(k)e^{-j\tilde{\theta}(k)} \quad (2)$$

The subsequent equalization, demodulation, etc. are performed on z(k) so as to compensate phase noise.

An algorithm for solving $\tilde{\theta}(k)$ is given below.

Figure 3:
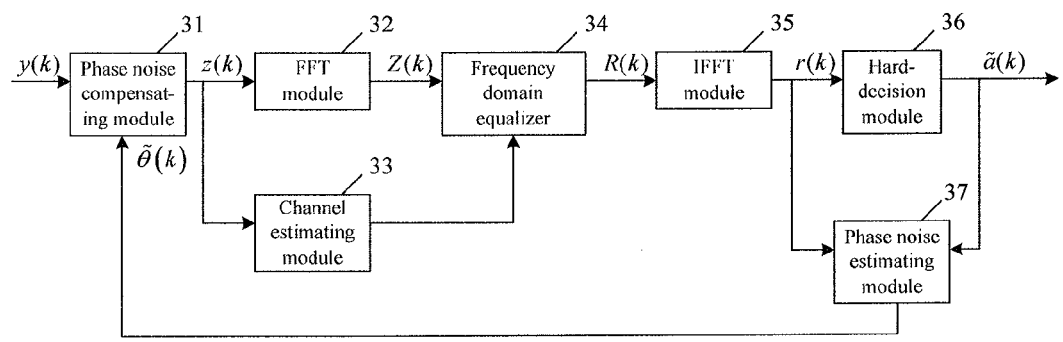
FIG. 3 is a structure diagram of a receiver according to an embodiment of the disclosure.
Figure 4:
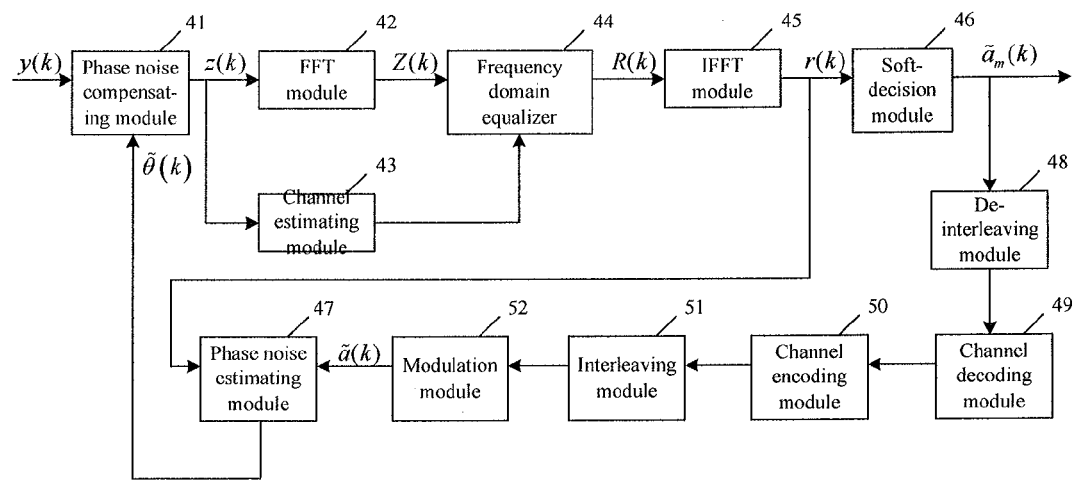
FIG. 4 is a structure diagram of a receiver according to another embodiment of the disclosure.

A public phase noise estimation value is defined as:

$$\tilde{\theta}_{avg} = \arg\left(\sum_{k=0}^{K-1} r(k)\tilde{a}^*(k)\right) \quad (3)$$

where ( )* represents the conjugate operation, arg( ) represents to obtain the argument of a complex number, and ã(k) represents the estimation value of the transmitted symbol a(k). As for the pilot part, a corresponding pilot symbol can be directly used; and as for the data part, it is obtained by performing equalization judgment, wherein this judgment may be a hard-decision, as shown in FIG. 3, and may also be implemented by a soft-decision in combination with reconstruction, as shown in FIG. 4. The performance of the soft-decision is relatively good, because the soft-decision has coding gain; however, on account of the high complexity of the method of soft-decision, the time delay is also relatively big. In addition, the public phase noise estimation value $\tilde{\theta}_{avg}$ represents the statistical average of the phase noise corresponding to all the symbols included in one data frame, in order to acquire the phase noises corresponding to respective symbols, it is also required to obtain their respective residual phase noise estimation values φ(k).

The residual phase noise estimation value φ(k) corresponding to the kth symbol is a low-pass random process, and it is represented as follows:

$$\phi(k)=\theta(k)-\tilde{\theta}_{avg} \quad (4)$$

φ(k) can be expanded using DCT basis functions as follows:

$$\phi(k) \approx \sum_{n=0}^{N-1} x_n \psi_n(k) \quad (5)$$

where $\psi_n(k)$ is the DCT basis functions, N is the number of the basis functions, $x_n$ is the coefficient of the nth basis function, and the value of $\psi_n(k)$ is as follows:

$$\psi_n(k) = \begin{cases} \sqrt{\dfrac{1}{K}}, & n=0 \\ \sqrt{\dfrac{2}{K}}\cos\left(\dfrac{\pi n}{K}\left(k+\dfrac{1}{2}\right)\right), & n>0 \end{cases} \quad (6)$$

Actually, the maximum likelihood estimation $\tilde{\phi}(k)$ of φ(k) can be obtained according to the following formula:

$$\tilde{\phi}(k) = \arg\left(r(k)\tilde{a}^*(k)e^{-j\tilde{\theta}_{avg}}\right) \quad (7)$$
$$\approx \theta(k) - \tilde{\theta}_{avg} + n(k)$$

In addition, $\tilde{\phi}(k)$ also can be represented to be:

$$\tilde{\phi}(k) = \sum_{n=0}^{N-1} \tilde{x}_n \psi_n(k) \quad (8)$$

where $\tilde{x}_n$ is the coefficient of the nth basis function used when DFT expansion is performed on $\tilde{\phi}(k)$.

A K×N orders basis function matrix $\Psi_K$ is constructed, the element of row k line n of $\Psi_K$ is:

$$(\Psi_K)_{k,n}=\psi_n(k), k=0,\ldots,K-1; n=0,\ldots,N-1 \quad (9)$$

The following formula can be obtained from formula (4):

$$\tilde{\theta}(k)=\tilde{\theta}_{avg}+\tilde{\phi}(k) \quad (10)$$

The estimation value $\tilde{\theta}(k)$ of the phase noise is obtained by substituting formula (8) to formula (10) as follows:

$$\tilde{\theta}(k) = \tilde{\theta}_{avg} + \sum_{k'=0}^{K-1} (\Psi_K \Psi_K^T)_{k,k'}\tilde{\phi}(k') \quad (11)$$

where $\Psi_K^T$; is transposition of $\Psi_K$.

It should be noted that formula (7) is approximatively valid when the signal-to-noise ratio is relatively high but is not accurate enough when the signal-to-noise ratio is relatively low. Actually, when the signal-to-noise ratio is relatively low, the influence of noise can be reduced by segmenting. It can be specifically processed like this: K symbols of each data frame are divided into M segments, each segment including B symbols, that is, K=BM.

Then, it is assumed that $$\tilde{\phi}_B(m) = \frac{1}{B} \arg\left(\sum_{b=0}^{B-1} r(b+mB) e^{-j\tilde{\theta}_{avg}} \tilde{a}^*(b+mB)\right)$$

$$\approx \frac{1}{B} \sum_{b=0}^{B-1} \phi(b+mB) + u(m)$$

$$\approx \sum_{n=0}^{N-1} x_n \psi_n^{avg}(m) + u(m)$$

$$\psi_n^{avg}(m) = \frac{1}{B} \sum_{b=0}^{B-1} \psi_n(b+mB)$$

where $\tilde{\phi}_B(m)$ represents the maximum likelihood estimation of residual phase noise of the symbol(s) of the mth segment, u(m) is white Gaussian noise suffered by the symbol(s) of the mth segment, m=0, ..., M−1.

The estimation value of phase noise of the kth symbol obtained by derivation is:

$$\tilde{\theta}_B(k) = \tilde{\theta}_{avg} + \sum_{m=0}^{M-1} \left(\Psi_K(\Psi_{avg}^T \Psi_{avg})^{-1} \Psi_{avg}\right)_{k,m} \tilde{\phi}_B(m)$$

where $(\Psi_{avg})_{m,n} = \Psi_n^{avg}(m)$, and $()^T$ is the transpose operation to the matrix.

It should be noted that the above formula derivation is directed to the processing method of adding phase noise under the environment of a white Gaussian noise (AWGN) channel. As for the multipath channel environment, it can be transformed into a model under the environment of AWGN channel through reasonable transformation, which is specifically described as follows.

As for the multipath channel environment, the multipath of the channel is represented as $\{h_l\}$, l=0, ..., L−1, where L is the number of symbols, the following transform can be made so as to transform this multipath channel environment into an AWGN model:

$$y(k) = v(k) e^{j\theta(k)} + n(k)$$

$$v(k) = a(k) * h(k)$$

where h(k) is a channel impulse response, v(k) is an ideal receiving signal, y(k) is an actual receiving signal affected by phase noise, and * represents convolution.

In addition, it should be specifically noted that the symbol output by an equalizer in the receiver can be generally considered to be an AWGN channel after being subjected to power normalized processing. The equalizer herein may be a time domain equalizer, also may be a frequency domain equalizer, also may be an equalizer using channel estimation, and also may be an adaptive automatic equalizer without using channel estimation, such as a least mean square (LMS) equalizer, a recursion least mean square (RLS) equalizer.

Based on the above principle for estimating phase noise, an embodiment of the disclosure provides a method for estimating phase noise.

Figure 1:
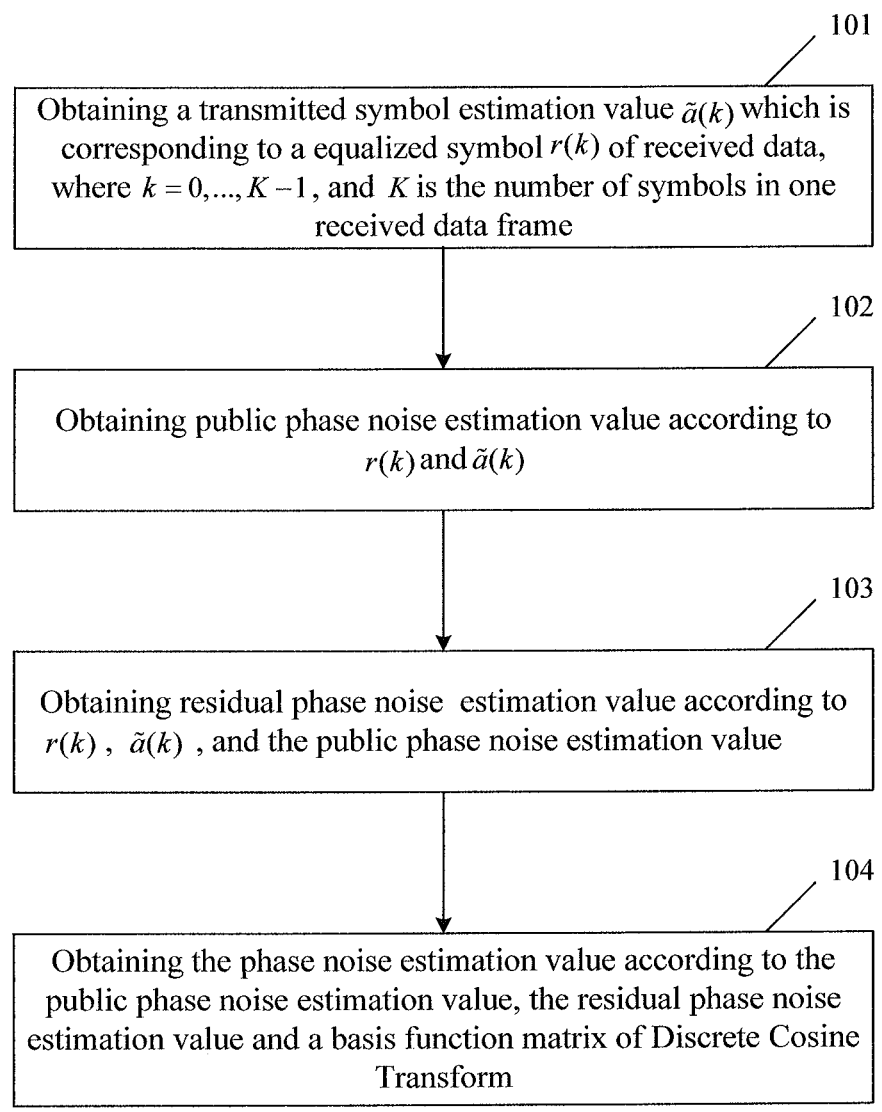
FIG. 1 is a flowchart of a method for estimating phase noise according to an embodiment of the disclosure.

With reference to FIG. 1, the method for estimating phase noise according to an embodiment of the disclosure may include the following steps.

Step 101: a transmitted symbol estimation value ã(k) which is corresponding to an equalized symbol r(k) of received data is obtained, where k=0, ..., K−1, and K is the number of symbols in one received data frame.

Step 102: a public phase noise estimation value is obtained according to r(k) and ã(k);

Step 103: a residual phase noise estimation value is obtained according to r(k), ã(k) and the public phase noise estimation value; and Step 104: a phase noise estimation value is obtained according to the public phase noise estimation value, the residual phase noise estimation value and a basis function matrix of Discrete Cosine Transform.

At step 101, the receiver firstly performs equilibrium processing on received data so as to obtain the equalized symbol r(k), then a hard-decision can be performed on r(k) so as to obtain corresponding transmitted symbol estimation value ã(k); alternatively, a soft-decision also can be performed on r(k), and reconstruction is performed on the basis of the result of the soft-decision so as to obtain corresponding transmitted symbol estimation value ã(k).

Optionally, as for the multipath channel environment, power normalized processing can be performed on the equalized symbol r(k) so as to further improve the accuracy of phase noise estimation.

After the transmitted symbol estimation values, respectively corresponding to K symbols of one data frame are obtained, at step 102, a public phase noise estimation value corresponding to this one data frame can be obtained according to the following formula:

$$\tilde{\theta}_{avg} = \arg\left(\sum_{k=0}^{K-1} r(k) \tilde{a}^*(k)\right)$$

where $\tilde{\theta}_{avg}$ is the public phase noise estimation value, ( )* represents to the conjugate operation, and arg( ) represents to obtain the argument of a complex number.

At step 103, the residual phase noise estimation value corresponding to the kth symbol can be obtained according to the following formula:

$$\tilde{\phi}(k) = \arg(r(k) \tilde{a}^*(k) e^{-j\tilde{\theta}_{avg}})$$

At step 104, the phase noise estimation value corresponding to the kth symbol can be obtained according to the following formula:

$$\tilde{\theta}(k) = \tilde{\theta}_{avg} + \sum_{k'=0}^{K-1} (\Psi_K \Psi_K^T)_{k,k'} \tilde{\phi}(k')$$

where $\Psi^K$ is the basis function matrix of Discrete Cosine Transform, $\Psi_K^T$ is transposition of $\Psi_K$, and $(\Psi_K)_{k,n} = \psi_n(k)$, $\psi_n(k)$ is the nth basis function of Discrete Cosine Transform, n=0, ..., N−1, and N is the number of the basis functions.

Alternatively, at step 103, the residual phase noise estimation also can be obtained according to the following formula:

$$\tilde{\phi}_B(m) = \frac{1}{B} \arg\left(\sum_{b=0}^{B-1} r(b+mB) e^{-j\tilde{\theta}_{avg}} \tilde{a}^*(b+mB)\right)$$

where K symbols of one received data frame are divided into M segments, each segment including B symbols, and $\tilde{\phi}_B(m)$ is the residual phase noise estimation value of the symbol(s) of the mth segment, m=0, ..., M−1.

Correspondingly, at step 104, the phase noise estimation value is acquired according to the following formula:

$$\tilde{\theta}_B(k) = \tilde{\theta}_{avg} + \sum_{m=0}^{M-1} \left(\Psi_K (\Psi_{avg}^T \Psi_{avg})^{-1} \Psi_{avg}\right)_{k,m} \tilde{\phi}_B(m)$$

where $\tilde{\theta}_B(k)$ is the phase noise estimation value of the kth symbol, $\Psi_K$ is the basis function matrix of Discrete Cosine Transform, $(\Psi_K)_{k,n} = \psi_n(k)$, $\psi_n(k)$ is the nth basis function of Discrete Cosine Transform, n=0, ..., N−1, N is the number of the basis functions, $\Psi_{avg}^T$ is transposition of $\Psi_{avg}$, and $$(\Psi_{avg})_{m,n} = \frac{1}{B} \sum_{b=0}^{B-1} \psi_n(b+mB).$$

In the above-mentioned steps, the value of $\psi_n(k)$ is obtained as follows:

$$\psi_n(k) = \begin{cases} \sqrt{\dfrac{1}{K}}, & n=0 \\ \sqrt{\dfrac{2}{K}} \cos\left(\dfrac{\pi n}{K}\left(k+\dfrac{1}{2}\right)\right), & n>0 \end{cases}$$

Corresponding to the above-mentioned method for estimating phase noise, an embodiment of the disclosure also provides an apparatus for estimating phase noise.

Figure 2:
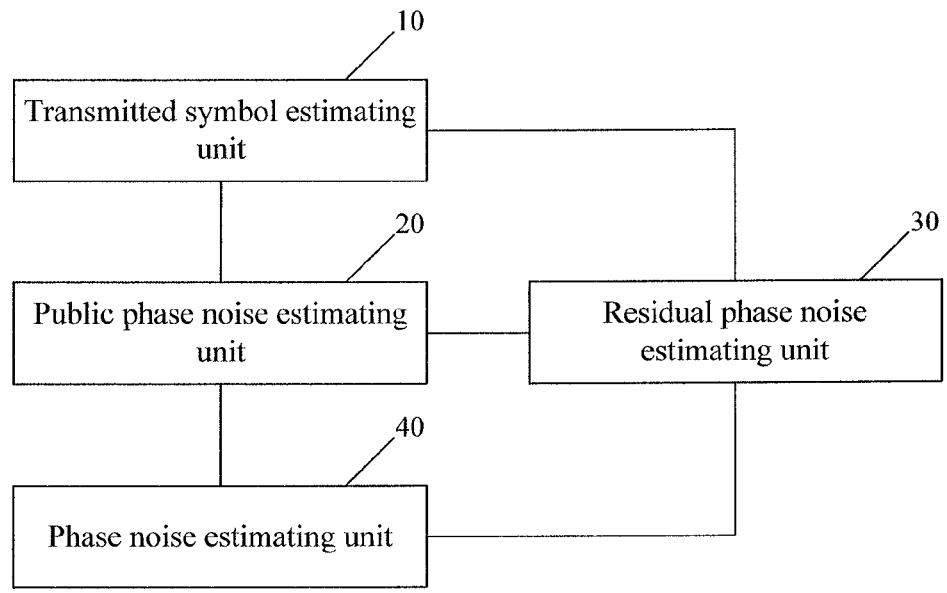
FIG. 2 is a flowchart of a device for estimating phase noise according to an embodiment of the disclosure.

With reference to FIG. 2, the apparatus for estimating phase noise of an embodiment of the disclosure may include:

a transmitted symbol estimating unit 10, configured to obtain a transmitted symbol estimation value ã(k) which is corresponding to an equalized symbol r(k) of received data, where k=0, ..., K−1, and K is the number of symbols in one received data frame;

a public phase noise estimating unit 20, coupled with the transmitted symbol estimating unit 10 and configured to obtain a public phase noise estimation value according to r(k) and ã(k);

a residual phase noise estimating unit 30, coupled with the transmitted symbol estimating unit 10 and the public phase noise estimating unit 20 and configured to obtain a residual phase noise estimation value according to r(k), ã(k) and the public phase noise estimation value; and a phase noise estimating unit 40, coupled to the public phase noise estimating unit 20 and the residual phase noise estimating unit 30 and configured to obtain phase noise according to the public phase noise estimation value, the residual phase noise estimation value and a basis function matrix of Discrete Cosine Transform.

The estimating apparatus is able to carry out a plurality of treatments described in the method embodiment, the specific working process and working principle thereof have been described in detail in the method embodiments and are not repeated again herein, and reference can be made to the description in the corresponding portion in the method.

The specific applications of the above-mentioned method and apparatus for estimating phase noise to the receiver of the wireless communication device are given below. The wireless communication device may be a communication device in a digital microwave system; and also may be communication devices in other mobile communication systems, such as mobile phones, PDA.

With reference to FIG. 3, the receiver of the embodiment of the disclosure may include: a phase noise compensating module 31, an FFT module 32, a channel estimating module 33, a frequency domain equalizer 34, an IFFT module 35, a hard-decision module 36 and a phase noise estimating module 37. In the present embodiment, the phase noise estimation is based on the hard-decision.

The working process of the receiver is as follows:

(1) At first, a baseband signal z(k) is received, during the equalization treatment for the first time, the phase noise information is unknown, therefore, at the moment, z(k)=y(k), where y(k) is a baseband signal not subjected to phase noise compensation, and then the channel estimating module 33 performs channel estimation to obtain the frequency domain representing form H(k) of the channel estimation, where k=0, ..., K−1, and K is the symbol number of one received data frame.

(2) The FFT module 32 performs FFT transform (fast Fourier transform) on a baseband signal z(k) of a time domain so as to obtain the frequency domain representing form Z(k) of the baseband signal z(k).

(3) The frequency domain equalizer 34 uses zero-forcing or MMSE (minimum mean square error) criterion, etc. to perform frequency domain equalization on Z(k) so as to obtain the equalization output symbol R(k) of the frequency domain.

(4) The IFFT module 35 performs IFFT transform (fast Fourier transform) on the frequency domain symbol R(k) output by the frequency domain equalizer 34 so as to obtain the time domain representing form r(k) of the equalized symbol.

(5) The hard-decision module 36 performs hard-decision on r(k) so as to obtain a time domain symbol ã(k), and this ã(k) is namely the transmitted symbol estimation value.

(6) The phase noise estimating module 37 performs phase noise estimation according to r(k) and ã(k), specifically as follows:

firstly, a public phase noise estimation value $\tilde{\theta}_{avg}$ is obtained using formula (3);

secondly, DCT basis function $\psi_n(k)$ is calculated using formula (6);

then $\tilde{\phi}(k)$ is calculated using formula (7), and $\Psi_K$ is calculated using formula (9);

and finally the phase noise $\tilde{\theta}(k)$ is calculated using formula (11).

(7) After the phase noise estimation value is obtained, the phase noise compensating module 31 performs phase noise compensation on the baseband signal according to formula (2) so as to obtain the compensated baseband signal z(k).

(8) The frequency domain equalizer 34 performs equilibrium processing on the compensated baseband signal z(k) to obtain a new equilibrium output r(k).

Iteration can be performed on the above-mentioned process for many times so as to better compensate the phase noise.

With reference to FIG. 4, the receiver of the another embodiment of the disclosure may include: a phase noise compensating module 41, an FFT module 42, a channel estimating module 43, a frequency domain equalizer 44, an IFFT module 45, a soft-decision module 46, a phase noise estimating module 47, a de-interleaving module 48, a channel decoding module 49, a channel coding module 50, an interleaving module 51 and a modulation module 52. In the present embodiment, the phase noise estimation is based on the soft-decision.

The working process of the receiver is as follows:

(1) At first, a baseband signal z(k) is received, during the equalization treatment for the first time, the phase noise information is unknown, therefore, at the moment, z(k)=y(k), where y(k) is a baseband signal not subjected to phase noise compensation, and then the channel estimating module 43 performs channel estimation to obtain the frequency domain representing form H(k) of the channel estimation, wherein k=0, . . . , K−1, and K is the symbol number of one received data frame.

(2) The FFT module 42 performs FFT transformation (fast Fourier transform) on a baseband signal z(k) of a time domain so as to obtain the frequency domain representing form Z(k) of the baseband signal z(k).

(3) The frequency domain equalizer 44 uses zero-forcing or MMSE (minimum mean square error) criterion, etc. to perform frequency domain equalization on Z(k) so as to obtain the equalization output symbol R(k) of the frequency domain.

(4) The IFFT module 45 performs IFFT transform (fast Fourier transform) on the frequency domain symbol R(k) output by the frequency domain equalizer 44 so as to obtain the time domain representing form r(k) of the equalized symbol.

(5) The soft-decision module 46 performs soft-decision on r(k) so as to obtain soft information $\tilde{a}_m(k)$ of bits.

(6) The de-interleaving module 48, the channel decoding module 49, the channel coding module 50, the interleaving module 51 and the modulation module 52 perform de-interleaving, channel decoding, channel coding, interleaving and modulation on $\tilde{a}_m(k)$ to obtain a time domain symbol, and $\tilde{a}(k)$ is namely an estimation value of the transmitted symbol.

(7) The phase noise estimating module 47 performs phase noise estimation according to r(k) and $\tilde{a}(k)$, specifically as follows:

firstly, a public phase noise estimation value $\tilde{\theta}_{avg}$ is obtained using formula (3);

secondly, DCT basis function $\psi_n(k)$ is calculated using formula (6);

then $\tilde{\phi}(k)$ is calculated using formula (7), and $\Psi_K$ is calculated using formula (9);

and finally the phase noise $\tilde{\theta}(k)$ is calculated using formula (11).

(8) After the phase noise estimation value is obtained, the phase noise compensating module 41 performs phase noise compensation on the baseband signal according to formula (2) so as to obtain the compensated baseband signal z(k).

(9) The frequency domain equalizer 44 performs equilibrium processing on the compensated baseband signal z(k) to obtain a new equilibrium output r(k).

Iteration can be performed on the above-mentioned process for many times so as to better compensate the phase noise.

Finally, it should be noted that the above embodiments are only used to describe but not restrict the technical solution of the disclosure, those skilled in the art should appreciate that amendments or equivalent substitutions can be performed on the technical solution of the disclosure but not be departed from the scope of the technical solution of the disclosure, which all should be covered in the scope of the claims of the disclosure.

What is claimed is:

1. A method for estimating phase noise, comprising:

obtaining a transmitted symbol estimation value $\tilde{a}(k)$ which is corresponding to a equalized symbol r(k) of received data, where k=0, . . . , K−1, and K is the number of symbols in one received data frame, and K is a positive integer;

obtaining a public phase noise estimation value according to r(k) and $\tilde{a}(k)$;

obtaining a residual phase noise estimation value according to r(k), $\tilde{a}(k)$ and the public phase noise estimation value; and obtaining a phase noise estimation value according to the public phase noise estimation value, the residual phase noise estimation value and a basis function matrix of Discrete Cosine Transform.

2. The method for estimating phase noise according to claim 1, wherein obtaining the transmitted symbol estimation value $\tilde{a}(k)$ corresponding to the equalized symbol r(k) comprises:

obtaining $\tilde{a}(k)$ by performing a hard-decision on r(k); or obtaining $\tilde{a}(k)$ by performing a soft-decision on r(k) and performing reconstruction on the bases of a result of the soft-decision.

3. The method for estimating phase noise according to claim 1, wherein the public phase noise estimation value is obtained according to the following formula:

$$\tilde{\theta}_{avg} = \arg\left(\sum_{k=0}^{K-1} r(k)\tilde{a}^*(k)\right)$$

where $\tilde{\theta}_a$, is the public phase noise estimation value, ( )* represents a conjugate operation, arg( ) represents to obtain argument of a complex number.

4. The method for estimating phase noise according to claim 3, wherein the residual phase noise estimation value is obtained according to the following formula:

$$\tilde{\phi}(k) = \arg(r(k)\tilde{a}^*(k)e^{-j\tilde{\theta}_{avg}})$$

where $\tilde{\phi}(k)$ is the residual phase noise estimation value of the k th symbol.

5. The method for estimating phase noise according to claim 4, wherein the phase noise estimation value is obtained according to the following formula:

$$\tilde{\theta}(k) = \tilde{\theta}_{avg} + \sum_{k'=0}^{K-1} (\Psi_K \Psi_K^T)_{k,k'} \tilde{\phi}(k')$$

where $\tilde{\theta}(k)$ is the phase noise estimation value, $\Psi_K$ is the basis function matrix of Discrete Cosine Transform, $\Psi_K^T$ is transposition of $\Psi_K$, $(\Psi_K)_{k,n} = \psi_n(k)$, and $\psi_n(k)$ is the nth basis function matrix of Discrete Cosine Transform, n=0, . . . , N−1, and N is the number of basis functions, and N is a positive integer.

6. The method for estimating phase noise according to claim 4, wherein the phase noise estimation value is obtained according to the following formula:

$$\tilde{\theta}_B(k) = \tilde{\theta}_{avg} + \sum_{m=0}^{M-1} \left(\Psi_K (\Psi_{avg}^T \Psi_{avg})^{-1} \Psi_{avg}\right)_{k,m} \tilde{\phi}_B(m)$$

where $\tilde{\theta}_B(k)$ is the phase noise estimation value, $\Psi_K$ is the basis function matrix of Discrete Cosine Transform, $(\Psi_K)_{k,n} = \psi_n(k)$, and $\psi_n(k)$ is the nth basis function of Discrete Cosine Transform, n=0, . . . , N−1, N is the number of basis functions, and N is a positive integer, and $\Psi_{avg}^T$ is transposition of the $\Psi_{avg}$, $$(\Psi_{avg})_{m,n} = \frac{1}{B}\sum_{b=0}^{B-1}\psi_n(b+mB),$$

where K symbols of one received data frame are divided into M segments, each segment including B symbols, and B and M are positive integers, m is an index of segment, and m=0,...,M−1, and b is an index of symbol, and b=0,...,B−1.

7. The method for estimating according to claim 3, wherein the residual phase noise estimation value is obtained according to the following formula:

$$\tilde{\phi}_B(m) = \frac{1}{B}\arg\left(\sum_{b=0}^{B-1} r(b+mB)e^{-j\tilde{\theta}_{avg}}\tilde{a}^*(b+mB)\right)$$

where K symbols of one received data frame are divided into M segments, each segment including B symbols, and $\tilde{\phi}_B(m)$ is the residual phase noise estimation value of one or more symbols of the mth segment, m=0,..., M−1, and B and M are positive integers.

8. An apparatus for estimating phase noise, comprising:
a transmitted symbol estimating unit, configured to obtain a transmitted symbol estimation value $\tilde{a}(k)$ which is corresponding to a equalized symbol r(k) of received data, where k=0,...,K−1, and K is the number of symbols in one received data frame, and K is a positive integer;
a public phase noise estimating unit, configured to obtain a public phase noise estimation value according to r(k) and $\tilde{a}(k)$;
a residual phase noise estimating unit, configured to obtain a residual phase noise estimation value according to r(k), $\tilde{a}(k)$ and the public phase noise estimation value; and
a phase noise estimating unit, configured to obtain a phase noise estimation value according to the public phase noise estimation value, the residual phase noise estimation value and a basis function matrix of Discrete Cosine Transform.

9. The apparatus for estimating phase noise according to claim 8, wherein the transmitted symbol estimating unit is further configured to:
obtain $\tilde{a}(k)$ by performing a hard-decision on r(k); or
obtain $\tilde{a}(k)$ by performing a soft-decision on r(k) and performing reconstruction on the bases of a result of the soft-decision.

10. A receiver, comprising the apparatus for estimating phase noise according to claim 9.

11. The apparatus for estimating phase noise according to claim 8, wherein the public phase noise estimating unit is further configured to obtain the public phase noise estimation value according to the following formula:

$$\tilde{\theta}_{avg} = \arg\left(\sum_{k=0}^{K-1} r(k)\tilde{a}^*(k)\right)$$

where $\tilde{\theta}_{avg}$ is the public phase noise estimation value, ( )* represents a conjugate operation, arg( ) represents to obtain argument of a complex number.

12. The apparatus for estimating phase noise according to claim 11, wherein the residual phase noise estimating unit is further configured to obtain the residual phase noise estimation value according to the following formula:

$$\tilde{\phi}(k) = \arg(r(k)\tilde{a}^*(k)e^{-j\tilde{\theta}_{avg}})$$

where $\tilde{\phi}(k)$ is the residual phase noise estimation value of the k th symbol.

13. The apparatus for estimating phase noise according to claim 12, wherein the phase noise estimating unit is further configured to obtain the phase noise estimation value according to the following formula:

$$\tilde{\theta}(k) = \tilde{\theta}_{avg} + \sum_{k'=0}^{K-1}(\Psi_K\Psi_K^T)_{k,k'}\tilde{\phi}(k')$$

where $\tilde{\theta}(k)$ is the phase noise estimation value, $\Psi_K$ is the basis function matrix of Discrete Cosine Transform, $\Psi_K^T$ is transposition of $\Psi_K$, $(\Psi_K)_{k,n}=\psi_n(k)$, $\psi_n(k)$ is the nth basis function matrix of Discrete Cosine Transform, n=0,..., N−1, and N is the number of basis functions, and N is a positive integer.

14. A receiver, comprising the apparatus for estimating phase noise according to claim 13.

15. A receiver, comprising the apparatus for estimating phase noise according to claim 12.

16. The apparatus for estimating phase noise according to claim 11, wherein the residual phase noise estimating unit is further configured to obtain the residual phase noise estimation value according to the following formula:

$$\tilde{\phi}_B(m) = \frac{1}{B}\arg\left(\sum_{b=0}^{B-1} r(b+mB)e^{-j\tilde{\theta}_{avg}}\tilde{a}^*(b+mB)\right)$$

wherein K symbols of one received data frame are divided into M segments, each segment including B symbols, and $\tilde{\phi}_B(m)$ is the residual phase noise estimation value of one or more symbols of the m th segment, m=0,..., M−1, and B and M are positive integers.

17. The apparatus for estimating phase noise according to claim 16, wherein the phase noise estimating unit is further configured to obtain the phase noise estimation value according to the following formula:

$$\tilde{\theta}_B(k) = \tilde{\theta}_{avg} + \sum_{m=0}^{M-1}\left(\Psi_K(\Psi_{avg}^T\Psi_{avg})^{-1}\Psi_{avg}\right)_{k,m}\tilde{\phi}_B(m)$$

where $\tilde{\theta}_B(k)$ is the phase noise estimation value, $\Psi_K$ is the basis function matrix of Discrete Cosine Transform, $(\Psi_K)_{k,n}=\psi_n(k)$, $\psi_n(k)$ is the n th basis function of Discrete Cosine Transform, n=0,..., N−1, N is the number of basis functions, and $\Psi_{avg}^T$ is transposition of the $\Psi_{avg}$, $$(\Psi_{avg})_{m,n} = \frac{1}{B}\sum_{b=0}^{B-1}\psi_n(b+mB).$$

18. A receiver, comprising the apparatus for estimating phase noise according to claim 11.

19. A receiver, comprising the apparatus for estimating phase noise according to claim 8.

20. A communication device, comprising the receiver according to claim 19.

\* \* \* \* \*